United States Patent [19]

Burk

[11] 4,370,390

[45] Jan. 25, 1983

[54] 3-D CHOPPED-FIBER COMPOSITES

[75] Inventor: Robert C. Burk, Chesterfield, Mo.

[73] Assignee: McDonnell Douglas Corporation, Long Beach, Calif.

[21] Appl. No.: 273,487

[22] Filed: Jun. 15, 1981

[51] Int. Cl.³ .................. B32B 9/00; B32B 27/14; B32B 15/04

[52] U.S. Cl. ................... 428/614; 52/309.1; 52/309.16; 52/659; 428/198; 428/288; 428/357; 428/364; 428/366; 428/367; 428/373; 428/375; 428/379; 428/395; 428/408; 428/411; 428/457; 524/907; 501/95

[58] Field of Search ............. 428/113, 112, 111, 110, 428/107, 105, 221, 225, 98, 198, 196, 457, 408, 401, 614, 296, 288, 364, 411, 357, 367, 366, 210, 539.5, 373, 379, 375, 395; 260/42, 17; 52/309.16, 309.1, 648, 659, 719, 740, ; 405/29, 34, 35; 524/907; 501/95

[56] References Cited

U.S. PATENT DOCUMENTS

| | | |
|---|---|---|
| 2,819,999 | 1/1958 | Gregory . |
| 3,053,713 | 11/1962 | Juras . |
| 3,231,341 | 1/1966 | Sump et al. ............ 428/401 |
| 3,380,253 | 4/1968 | Vita ....................... 405/29 |
| 3,491,055 | 1/1970 | Talley ................. 260/42.17 X |
| 3,573,086 | 3/1971 | Lambdin, Jr. . |
| 3,769,142 | 10/1973 | Holmes et al. . |
| 3,826,172 | 7/1974 | Dawson . |
| 3,837,985 | 11/1974 | Chase . |
| 3,852,930 | 12/1974 | Naaman ................. 52/659 |
| 3,949,126 | 4/1976 | Crawford, Jr. ........ 428/113 |
| 4,048,371 | 9/1977 | Brumlik ............... 428/364 X |
| 4,064,207 | 12/1977 | DeCrescente et al. . |
| 4,131,708 | 12/1978 | Moores et al. . |
| 4,168,337 | 9/1979 | Maistre . |
| 4,169,911 | 10/1979 | Yoshida et al. . |
| 4,219,597 | 8/1980 | Maistre . |
| 4,268,560 | 5/1981 | Maistre ............... 428/113 X |

FOREIGN PATENT DOCUMENTS 55-73737  6/1980  Japan ..................... 524/907

Primary Examiner—Lorraine T. Kendell
Attorney, Agent, or Firm—Paul T. Loef; George W. Finch; Donald L. Royer

[57] ABSTRACT

A low-cost composite structure, having near isotropic mechanical properties, produced by molding a matrix material with a reinforcing fiber element. The reinforcing fiber elements are comprised of three or more fibers to form a three-dimensional figure. In the preferred embodiment at least one fiber is oriented in each of the mutually perpendicular planes similar in appearance to a child's jack. The matrix material may be any material which provides a suitable bond with the reinforcing fiber elements.

17 Claims, 3 Drawing Figures

3-D CHOPPED-FIBER COMPOSITES

BACKGROUND OF THE INVENTION

This invention relates to fiber reinforced composite materials or structures and more particularly to composite material reinforced by three-dimensional fiber elements randomly distributed in a matrix in a structure or material formed by molding.

Initial efforts to make molded chopped-fiber composites employed short one-dimensional (1-D) fibers randomly aligned in a matrix material to provide reinforcement. Randomly oriented, 1-D, chopped fibers are not isotropic and cannot be relied upon to produce homogeneous structures. The random alignment inevitably results in a situation where few or no fibers are oriented in the direction of the applied stress and result in a weak, low-strength structure. Since the location of these weak spots cannot be determined apriori, the entire structure must be designed using low allowable strengths that will encompass the scatter of material properties. This problem has been partially addressed by using pieces of woven cloth as a 2-D reinforcing material randomly distributed in the composite. Woven cloth reinforcement fibers provide good strength in two of the three dimensions, but the random distribution results in almost the same limitation as 1-D reinforced composites.

In an effort to achieve isotropic strength properties in a fiber-reinforced structure, fiber reinforcement in the third dimension has been accomplished by either weaving three-dimensional fiber reinforcing structures or driving the third dimensional fiber through a series of two dimensional woven structures. All of these structures produced a geometrically repeatable pattern of relative positions of one fiber to another with some type of replicated geometry throughout the structure. While these structures accomplished the purpose, they are very expensive.

The present invention is particularly concerned with producing a composite structure with near-isotropic strength properties by molding a fiber element with three-dimensionally oriented fibers in a matrix material. The fiber elements are randomly oriented, overlapping and interlocking (as opposed to a woven geometric array) to produce the structure at a reasonable cost.

BRIEF SUMMARY OF THE INVENTION

In summary, according to this invention, a relatively low-cost composite structure, having near-isotropic mechanical properties, is produced by molding a matrix material with a reinforcing fiber element. The reinforcing fiber elements are comprised of three or more fibers to form a three-dimensional figure (fiber directions not lying in a single plane). In the resulting composite structure, the reinforcing fibers are randomly oriented and both overlap and interlock. The matrix material may be any material which provides a suitable bond with the reinforcing fiber elements to produce the desired properties.

DETAILED DESCRIPTION OF THE PREFERRED EMBODIMENT

The present invention is directed to composite structures, having isotropic mechanical properties, formed by molding reinforcing fiber elements in a matrix material. The fibers are oriented to produce three-dimensional reinforcement which is randomly distributed so as to overlap and interlock the fibers. The matrix material may be any material which bonds to the reinforcing fiber elements e.g. graphite, metals, ceramics, plastics, cermets and resins. The fibers may be monofilaments or comprise a plurality of tow or twisted, stranded or unstranded filament material. The fiber material may be any material capable of being produced in a fiber form. Typical fibers are produced from carbon, boron, graphite, quartz, fiberglass, silicon carbide, Kevlar and stainless steel.

Figure 1:
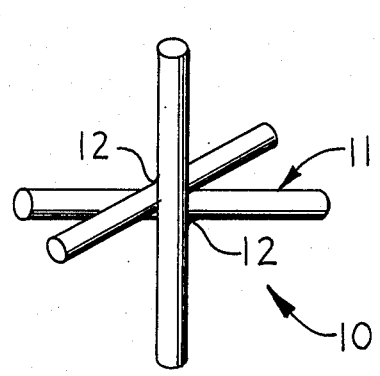
FIG. 1 is one embodiment of the reinforcing fiber element with three fibers oriented with their axes mutually perpendicular to form an orthogonal reinforcement.

Referring to the drawings, wherein like characters refer to like parts, FIG. 1 shows a single reinforcing fiber element 10 with the fiber 11 axes oriented so as to be mutually perpendicular with respect to each other and form a three-dimensional fiber element 10 similar in appearance to a childs jack. The intersection of the fibers form a filet type nodal point, as at 12, which strengthens and bond. This embodiment of the reinforcing fiber element, while currently the preferred embodiment, may contain more fibers in each plane or in skewed planes. However, the number of fibers in each fiber element should be restricted to ensure overlapping and interlocking of the multiple fiber elements and maximize the fiber volume fraction of the molded structure.

The particular fiber elements used to reinforce the sample structure tested to date were made from glass fibers. these fibers were coated with an epoxy and cured into the fiber elements as shown in FIG. 1. The pre-cured reinforcing fiber elements were then mixed with a suitable amount of the same epoxy used to bond the fibers and compression molded to form the test coupons. During the compression molding process, the fibers at the surface may be bent parallel to the mold surface. However, this enhances the strength properties of the composite structure since stresses at the surface of a material must be parallel to the surface.

The reinforcing fiber elements used in the test specimens were formed by weaving a three-dimensional open lattice grid and spraying or dipping the open lattice grid in an epoxy binder to form bonds at the nodes and stiffen the fibers. The grid was then cut apart (chopped) to form the individual orthogonal 3-D fiber elements.

Comparable samples were made by compression molding 3-D chopped fiber elements as shown in FIG. 1 and 1-D, single axis, chopped fibers. Both samples were molded with the same epoxy matrix for comparison purposes. The samples were cut into beam specimens and tested to failure in four-point bending. Both strength and stiffness were measured.

The 3-D chopped fiber samples were found to be more homogenous and isotropic than the 1-D chopped fiber samples. In all catagories measured, the 3-D orthogonal fiber elements had less standard deviation in the data points measured, i.e. less data scatter, than the 1-D, single axis, chopped fiber specimens. The average 3-D strength was found to be slightly higher in the longitudinal and transverse (L and T) directions and significantly higher in the short transverse (ST) direction. While the 3-D stiffness was lower in the L and T direction, the average 3-D stiffness in the ST direction was more than twice as high as the 1-D sample. The slightly reduced elastic modulus of the 3-D fiber element as compared to the 1-D fiber element can be explained by the fact that the 3-D element composite had a density about 10% less than that of the 1-D samples due to lower fiber content (30% to 35% vs 35% to 55%). While the 3-D fiber content can probably be increased over those of the test specimens, it is not expected to ever reach the same density as a 1-D chopped-fiber material. The increased average strength properties and the greatly increased average stiffness in the ST direction, and the reduced data scatter result in higher design allowables for the 3-D chopped fiber composite. The associated structural weight reductions permit high and complexly stressed parts, which until now were restricted to metals or 3-D woven laminates, to be made from 3-D chopped fiber reinforced composites.

The following chart compares the estimated strength and relative cost of the 3-D chopped fiber reinforced structure with that of 1-D and 2-D chopped fiber, aluminum, and woven laminate structures.

|  | $F_{TU}$ (KSI) | DENSITY $\rho$ (lb/in³) | BENDING EFFICIENCY $\sqrt{\dfrac{F_{TU}}{\rho}}$ | RELATIVE COST |
|---|---|---|---|---|
| 1-D Chopped Fibers | 10 | .07 | 45 | 1 |
| 3-D Chopped Fibers | 35 | .07 | 85 | 3 |
| Aluminum | 70 | .10 | 85 | 4 |
| 2-D Laminate (L, T, ST) | 60, 60, 5 | .07 | 110, 110,30 | 10 |
| 3-D Woven Laminate | 35 | .07 | 85 | 80 |

The 3-D fiber element reinforced composite structure of this invention provides essentially the same strength efficiency as aluminum or a 3-D woven laminate with cost savings of 25% and 96%, respectively.

Figure 2:
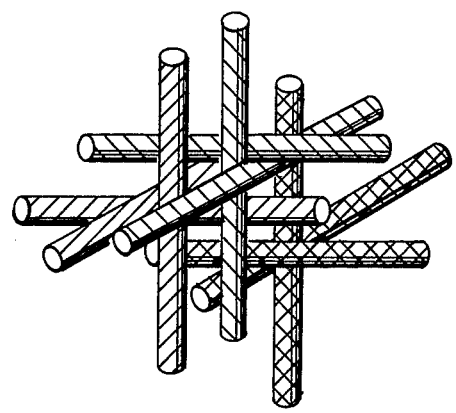
FIG. 2 shows a nesting of three of the orthogonal fibers of FIG. 1.
Figure 3:
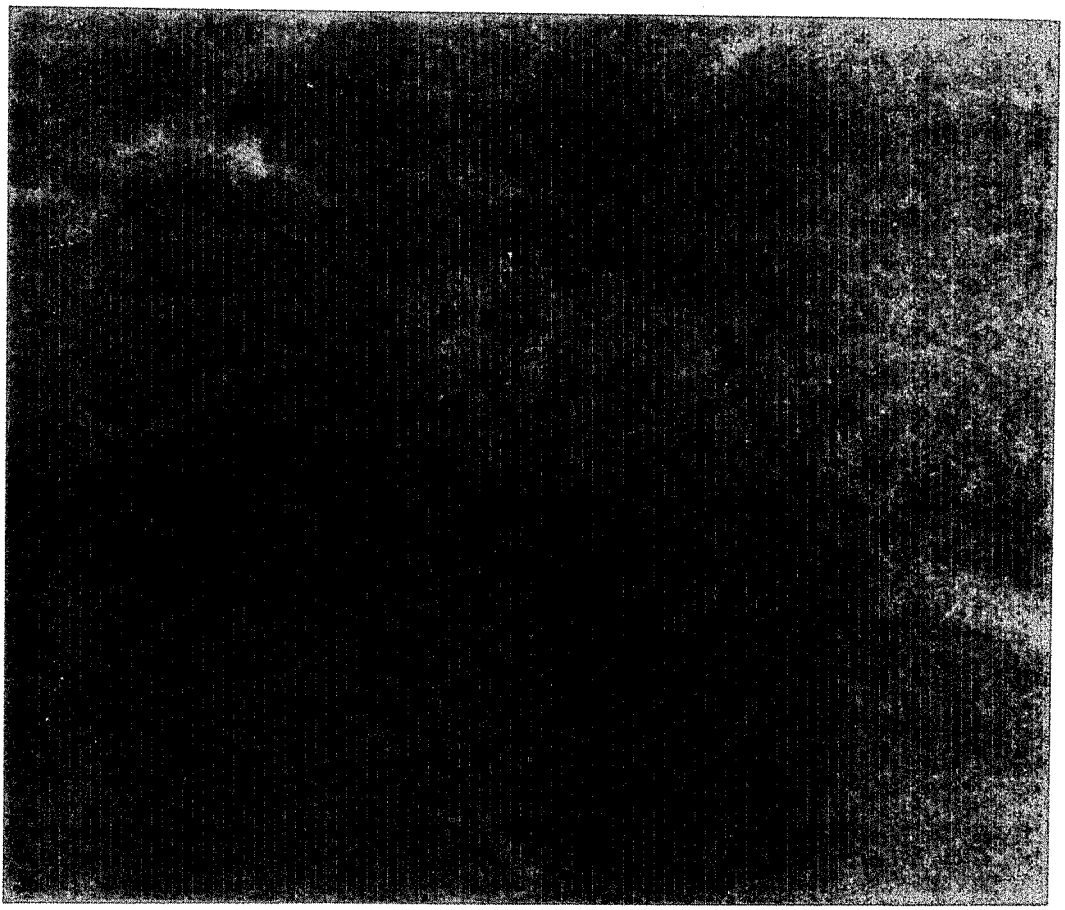
FIG. 3 is a photograph of a large group of the orthogonal fibers of FIGS. 1 and 2 shown randomly distributed and oriented to demonstrate how they naturally overlap and lock.

The specific composite structure used to establish feasibility contained 3-D orthogonal fiber elements, as shown in FIGS. 1-3, using glass fibers 0.030 inches in diameter by 0.50 inch long, coated with epoxy, precured and then molded with additional epoxy. However, it is believed that a thermo-plastic resin, e.g. polyethersulfone could be used to improve fiber content as no additional resin would have to be added during the molding process. However, the possible combinations of fibers and matrix material are as unlimited as the imagination provided a bond can be made between the matrix and the fibers.

Also, while the samples tested herein were made by compression molding, injection molding is a candidate process provided the reinforcing fiber elements are small enough to pass through the injection molding nozzle.

Since many changes may be made in the inventive product without departing from the scope of the invention, it is intended that all matter contained in the above description shall be interpreted as illustrative and not in a limiting sense.

What is claimed is:

1. A material formed by molding, having a composite structure comprising:
    a matrix material; and
    a plurality of discrete reinforcing fiber elements randomly oriented, overlapping and interlocking with respect to each other and contained in and bonded to said matrix material, said fiber elements further comprising:
    at least three uni-directional fibers, each having a longitudinal axis, joined together before adding said matrix material, so that each of said fibers is oriented in fixed, skewed and overlapping relationship with the remaining of said at least three fibers and at least one of said at least three fibers lies in a plane other than the plane of said axes of the remainder of said at least three fibers.

2. The composite material of claim 1 wherein the distal end of said reinforcing fiber elements near the surface of said composite structure are bent over so as to parallel said surface.

3. The composite material of claim 1 wherein said fiber elements are formed from said at least uni-directional fibers and are bonded at a common intersectional node.

4. The composite material of claim 1 wherein said matrix material is a plastic.

5. The composite material of claim 1 wherein said matrix material is a ceramic.

6. The composite material of claim 1 wherein said matrix material is a metal.

7. The composite material of claim 1 wherein said composite material is formed by compression molding.

8. The composite material of claim 1 wherein said composite material is formed by injection molding.

9. The composite material of claim 1 wherein said at least three uni-directional fibers are oriented with their axes mutually perpendicular with respect to each other so as to form three-dimensional fiber elements similar in appearance to a child's jack.

10. The composite material of claim 9 wherein said three-dimensional fiber elements are coated with a binder coating which forms a bond at the intersectional nodes of said fibers.

11. The composite material of claim 10 wherein said binder coating material and said matrix material are similar material.

12. The composite material of claim 10 wherein said binder coating on said three-dimensional fiber elements also forms said matrix material after compression molding.

13. A material formed by molding, having a composite structure comprising:
    a matrix material; and
    a plurality of discrete reinforcing fiber elements randomly oriented, overlapping and interlocking with respect to each other and contained in and bonded to said matrix material, said fiber elements further comprising:
    at least three uni-directional fibers with at least one of said three fibers oriented in each of three mutually perpendicular planes and said at least three fibers further oriented with their axes displaced at least 30 degrees with respect to each other.

14. The composite material of claim 13 wherein the distal end of said reinforcing fiber elements near the surface of said composite structure are bent over so as to parallel said surface.

15. The composite material of claim 13 wherein said fiber elements are formed from said at least three fibers and are bonded at a common intersectional node.

16. A material formed by molding, having a composite structure comprising:
a matrix material; and
a plurality of discrete reinforcing fiber elements randomly oriented, overlapping and interlocking with respect to each other and contained in and bonded to said matrix material, said fiber elements further comprising:
at least three uni-directional fibers, each having a longitudinal axis, joined together before adding said matrix material, so that each of said fibers is oriented in fixed, skewed, and intersecting relationship, at least one of said at least three fibers lying in a plane other than the plane of said axes of the remainder of said at least three fibers, and formed from a contiguous homogeneous material with said uni-directional fibers oriented to intersect at a common point.

17. The composite material of claim 13 wherein the distal end of said reinforcing fiber elements near the surface of said composite structure are bent over so as to parallel said surface.

* * * * *

UNITED STATES PATENT AND TRADEMARK OFFICE
CERTIFICATE OF CORRECTION

PATENT NO. : 4,370,390
DATED : 25 January 1983
INVENTOR(S) : Robert C. Burk

It is certified that error appears in the above—identified patent and that said Letters Patent is hereby corrected as shown below:

IN THE CLAIMS:

Col. 4, Line 23, insert the word three after the word "least"

Signed and Sealed this

Twenty-first Day of February 1984

[SEAL]

Attest:

GERALD J. MOSSINGHOFF

Attesting Officer   Commissioner of Patents and Trademarks